United States Patent
Jang et al.

(10) Patent No.: US 9,661,719 B2
(45) Date of Patent: May 23, 2017

(54) FOLDABLE DISPLAY DEVICE

(71) Applicant: LG DISPLAY CO., LTD., Seoul (KR)

(72) Inventors: Se Jin Jang, Paju-si (KR); Noh Jin Myung, Paju-si (KR); Tae Hyoung Kwak, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/961,058

(22) Filed: Dec. 7, 2015

(65) Prior Publication Data
US 2016/0165697 A1  Jun. 9, 2016

(30) Foreign Application Priority Data
Dec. 8, 2014  (KR) .................. 10-2014-0174825

(51) Int. Cl.
*H01J 1/62* (2006.01)
*H05B 33/22* (2006.01)
*G06F 3/041* (2006.01)
*H05B 33/04* (2006.01)

(52) U.S. Cl.
CPC .......... *H05B 33/22* (2013.01); *G06F 3/0412* (2013.01); *H05B 33/04* (2013.01); *G06F 2203/04102* (2013.01)

(58) Field of Classification Search
CPC .................. H05K 1/028; H05K 2201/055
USPC .................................. 313/511, 506
See application file for complete search history.

*Primary Examiner* — Vip Patel
(74) *Attorney, Agent, or Firm* — Birch, Stewart, Kolasch & Birch, LLP

(57) ABSTRACT

A foldable display device adapted to minimize waviness caused by being folded and then unfolded is discussed. The foldable display device according to an embodiment includes a display panel, a flexible film and an adhesion layer interposed between the display panel and the flexible film. The adhesion layer is partially removed from a fold area of the foldable display device.

15 Claims, 4 Drawing Sheets

FOLDABLE DISPLAY DEVICE

CROSS REFERENCE TO RELATED APPLICATION

This application claims the priority benefit of Korean Patent Application No. 10-2014-0174825, filed on Dec. 8, 2014, which is hereby incorporated by reference in its entirety into this application.

BACKGROUND OF THE INVENTION

Field of the Disclosure

The present application relates to a foldable display device. More particularly, the present application relates to a foldable display device developed to minimize the generation of surface waviness which is caused by repeated fold and unfold operations.

Description of the Related Art

Nowadays, public demands for applying a large-sized screen in portable devices, such as mobile phones, tablet personal computers and so on, are being increased. As such, the general public shows a keen interest in foldable display devices. The foldable display devices have features of easier portability, a larger-sized screen and so on.

Figure 1:
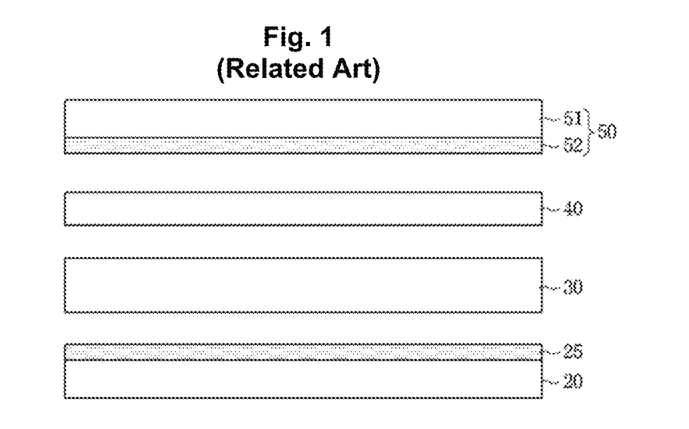
FIG. 1 is a cross-sectional view showing a foldable display device according to the related art.

The foldable display devices developed up to the present can cause waviness in a fold portion by being repeatedly folded and unfolded. As shown in FIG. 1, a foldable display device of the related art includes a touch panel 40 disposed on a flexible display panel 30 and a cover window member 50 disposed on the touch panel 40. The touch panel 40 can realize a touch input. The cover window member 50 can prevent external impacts and scratches. Also, the related art foldable display device includes a back plate 20 disposed on a lower surface of the flexible display panel 30 configured to support the flexible display panel 30. A cover window 51 included in the cover window member 50 is combined with the touch panel 40 by means of an optical clear adhesive layer 52. The back plate 20 is combined with the flexible display panel 30 by means of another optical clear adhesive layer 25. Although it is not displayed in the drawing, a circular polarizing plate can further be disposed on one of upper surfaces of the display panel 30 and the touch panel 40. The circular polarizing plate can reduce the reflection of external light.

Such a related art display device allows several film layers or panels to be attached to one another using adhesion layers. As such, when the display device is folded, a contractile force is applied to the film, panel and adhesive layer disposed in an upper portion of the display device and a tensile force is applied to the film, panel and adhesion layer disposed in a lower portion of the display device. The compressive and tensile forces can cause a plastic deformation of the film and a deformation of the adhesion layer. Due to this, the waviness can be generated in a fold portion of the display device which is largely affected by the contractile and tensile forces. Particularly, if the display device has been folded for a long time or repeatedly, the waviness corresponding to an outside appearance defect can be generated because a waved surface of the display device cannot be restored. The waved portion of the surface of the display device can deteriorate a degree of touch sensitivity. Due to this, the touch panel cannot be normally driven.

Figure 2:
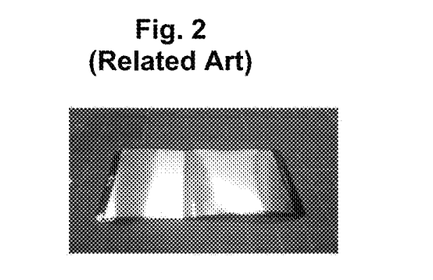
FIG. 2 is a photograph showing waviness generated in the related art foldable display device which is unfolded after it is folded for 24 hours.

FIG. 2 is a photograph showing the related art foldable display device which is unfolded after it has been folded in a curvature of about 2.5 R for 24 hours. As seen from FIG. 2, it is evident that the waviness is generated in the surface of the foldable display device.

BRIEF SUMMARY OF THE INVENTION

Accordingly, the embodiments of the present application are directed to a foldable display device that substantially obviates one or more of problems due to the limitations and disadvantages of the related art.

The embodiments are to provide a foldable display device which is adapted to minimize the generation of surface waviness.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

A foldable display device according to a general aspect of the present embodiments includes a display panel, a flexible film and an adhesion layer. The flexible film is disposed under the display panel. The adhesion layer is interposed between the display panel and the flexible film. Also, the adhesion layer is removed from a fold area of the display device.

The flexible film is preferably formed to have a major edge length which satisfies the following equation 1.

$$L2-L1=(R2-R1)\times \pi \qquad [\text{Equation 1}]$$

In the equation 1, 'L1' is a major edge length of the display panel, 'L2' is the major edge length of the flexible film 300, 'R1' is a radius of curvature in a completely folded state of the display panel, and 'R2' is a radius of curvature in a completely folded state of the flexible film.

An air gap is formed in an area in which the adhesion layer is removed. Also, the flexible film includes an air path which allows air to flow into and out the air gap.

The foldable display device can further include a support member disposed under the flexible film and configured to support the display panel and the flexible film. The support member can be configured to move by an air pressure from side to side.

To this end, the support member includes an elastic element and a movable supporter connected to the elastic element.

Also, the foldable display device can include a case configured to receive the display panel and the flexible film. Moreover, the foldable display device can include a touch panel and/or a cover window disposed on the display panel.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Reference will now be made in detail to display panels according to the embodiments of the present disclosure, examples of which are illustrated in the accompanying drawings. These embodiments introduced hereinafter are provided as examples in order to convey their spirits to the ordinary skilled person in the art. Therefore, the present disclosure is not limited to these embodiments described here and the accompanying drawings.

In the following description, numerous specific details are set forth, such as particular structures, sizes, ratios, angles, coefficients and so on, in order to provide an understanding of the various embodiments of the present disclosure. However, it will be appreciated by one of ordinary skill in the art that the various embodiments of the present disclosure may be practiced without these specific details. The same reference numbers will be used throughout this disclosure to refer to the same or like parts. In other instances, well-known technologies have not been described in detail in order to avoid obscuring the present disclosure.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. As used herein, the singular forms "a", "an" and "the" are intended to include the plural forms as well, unless the context clearly indicates otherwise.

Elements used in the present disclosure without additional specific details must be considered to include tolerance.

In the description of embodiments, when a structure is described as being positioned "on or above" or "under or below" another structure, this description should be construed as including a case in which the structures contact each other as well as a case in which a third structure is disposed therebetween.

The temporal terms of "after", "subsequently", "next", "before" and so on used in this disclosure without specifying "immediately" or "directly" can include other discontinuously temporal relations.

Moreover, although some of the elements are designated with numerical terms (e.g., first, second, third, etc.), it should be understood that such designations are only used to specify one element from a group of similar elements, but not to limit the element in any specific order. As such, an element designated as a first element could be termed as a second element or as third element without departing from the scope of exemplary embodiments.

The features of various exemplary embodiments of the present disclosure may be partially or entirely bound or combined with each other, and be technically engaged and driven using various methods as apparent to those skilled in the art, and the exemplary embodiments may be independently practiced alone or in combination.

Figure 3:
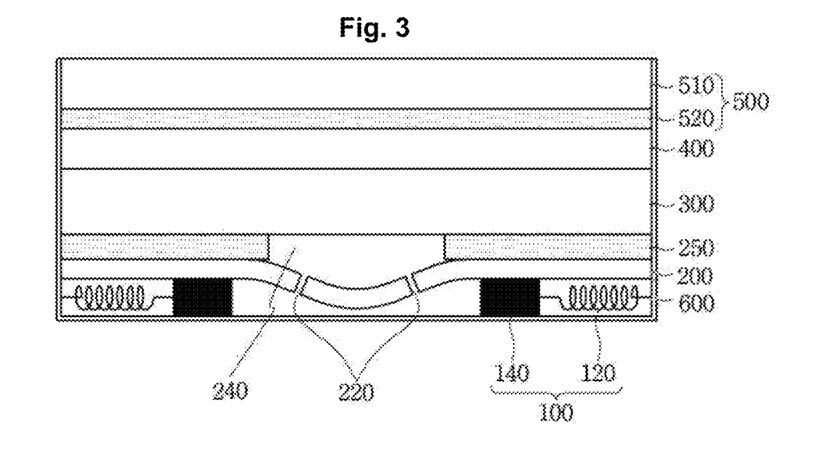
FIG. 3 is a cross-sectional view showing a foldable display device according to an embodiment of the present invention.

FIG. 3 is a cross-sectional view showing a foldable display device according to an embodiment of the present disclosure. As shown in FIG. 3, the foldable display device of the present disclosure includes a display panel 300, a flexible file 200 and a first adhesion layer 250 interposed between the display panel 300 and the flexible film 200. All the components of the foldable display device in all the embodiments of the present invention are operatively coupled and configured.

Also, the foldable display device of the present disclosure can include support members 100 disposed under the flexible film 200. Moreover, the foldable display device of the present disclosure can include a touch panel 400 disposed on the display panel 300. Furthermore, the foldable display device of the present disclosure can include a cover window member 500 disposed on the touch panel 400.

The components included in the foldable display device of the present disclosure will now be described in detail.

First, the display panel 300 can be used to display images. The display device 300 can become an organic light emitting diode (hereinafter, 'OLED') display panel, as an example.

Figure 4:
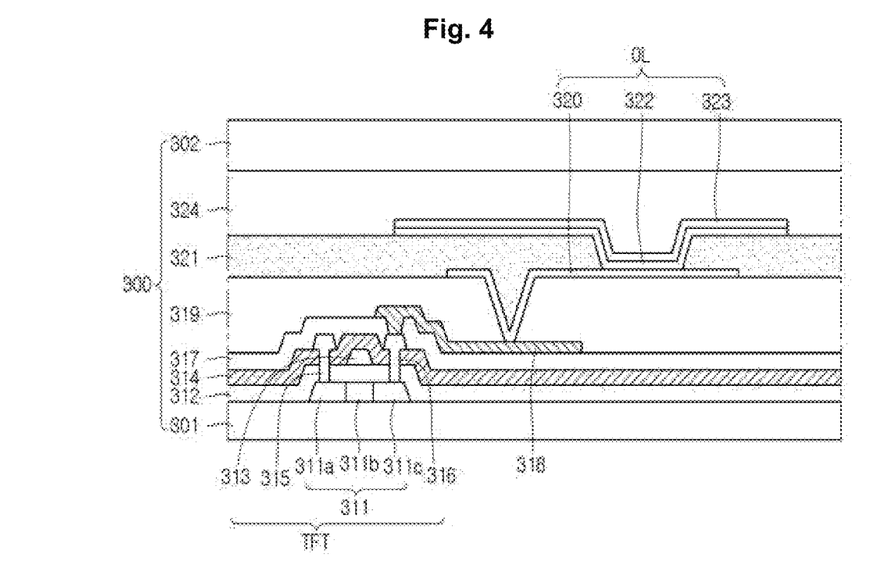
FIG. 4 is a cross-sectional view showing a display panel of the foldable display device according to an embodiment of the present invention.

FIG. 4 shows an OLED display panel 300 which is used as an example of the display panel of the foldable display device according to an embodiment of the present disclosure. As shown in FIG. 4, the OLED display panel 300 includes a first substrate 301, which includes a thin film transistor TFT and an organic light emitting element OL electrically connected to the thin film transistor TFT, and a second substrate 302 configured to protect the organic light emitting element OL. Each of the first substrate 301 and the second substrate 302 can be a flexible substrate such as a plastic substrate.

The thin film transistor TFT is formed on one surface of the first substrate 301. Such a thin film transistor TFT includes a semiconductor layer 311, a gate electrode 313, a source electrode 315 and a drain electrode 316.

In detail, the semiconductor layer 311 including a source domain 311a, a channel domain 311b and a drain domain 311c is formed on the first substrate 301. A gate insulation film 312 is formed on the entire surface of the first substrate 301 provided with the semiconductor layer 311. A gate line and the gate electrode 313 branched from the gate line are formed on the gate insulation film 312. An interlayer insulation film 314 covering the gate line and the gate electrode 313 is formed.

Also, a data line, the source electrode 315 branched from the data line and the drain electrode 316 separated from the source electrode 315 by a fixed distance are formed on the interlayer insulation film 314. The data line crosses the gate line with having the interlayer insulation film 314 therebetween, and defines a pixel region. The source electrode 315 and the drain electrode 316 come in contact with the source domain 311a and the drain domain 311c of the semiconductor layer 311 via respective first contact holes which are formed to sequentially penetrate through the interlayer insulation film 314, covering the gate electrode 313, and the gate insulation film 312.

A passivation layer 317 is formed on the entire surface of the first substrate 301 provided with the source and drain electrodes 315 and 316, and a second contact hole exposing the drain electrode 316 is formed in the passivation layer 317. The exposed drain electrode 316 is electrically connected to a connection electrode 318 which is formed on the passivation layer 317. A planarization film 319 is formed on the entire surface of the first substrate 301 provided with the thin film transistor TFT, and a third contact hole exposing the connection electrode 318 is formed in the planarization film 319.

The organic light emitting element OL electrically connected to the thin film transistor TFT via the third contact hole formed in the planarization film 319 is formed on the first substrate 301. The organic light emitting element OL includes a lower electrode 320, an organic emission layer 322 and an upper electrode 323.

More specifically, the lower electrode 320 of the organic light emitting element OL electrically connected to the exposed connection electrode 318 is formed on the planarization film 319. Although it is shown in the drawing that the lower electrode 320 of the organic light emitting element OL is electrically connected to the drain electrode 315 of the thin film transistor TFT via the connection electrode 318, the connection electrode 318 can be removed from the OLED panel 300. In this case, the lower electrode of the organic light emitting element OL can be formed on the planarization film 319 in such a manner as to directly contact the drain electrode 315 of the thin film transistor TFT via a contact hole which penetrates through the planarization film 319 and the passivation film 317.

A bank pattern 321 exposing the lower electrode 320 by a pixel region size is formed on the planarization film 319 provided with the lower electrode 320. The organic emission layer 322 is formed on the exposed lower electrode 320. The organic emission layer 322 can be configured with a single layer formed from an emission material. Alternatively, in order to enhance a light emission efficiency, the organic emission layer can be formed in a multi-layer structure with a hole injection layer, a hole transport layer, an emission material layer, an electron transport layer and an electron injection layer.

The upper electrode 323 is formed on the organic emission layer 322. If the lower electrode 320 is used as an anode electrode, the upper electrode 323 should be used as a cathode electrode. On contrary, the upper electrode 323 should be used as an anode electrode when the lower electrode 320 is used as a cathode electrode.

A sealing member is formed on the first substrate 301 provided with the thin film transistor TFT and the organic light emitting element OL. For example, the sealing member can be configured with the sealing layer 324 and the second substrate 302. In this case, the sealing layer 324 used to protect the display elements (i.e., the organic light-emitting elements OL) is formed on the entire surface of the first substrate 301 provided with the upper electrode 323. The sealing layer 324 can be formed in a multi-layer structure. The second substrate 302 can be combined with the sealing layer 324. The second substrate 302 can be a sealing substrate used to encapsulation of the first substrate 301. However, the sealing member disposed on the first substrate 301 is not limited to the combination of the sealing layer 324 and the second substrate 302. In other words, a variety of different sealing members well-known to the public can be used to prevent the intrusion of oxygen, moisture and so on, instead of the sealing layer 324 and the second substrate 302.

Such a configuration of the OLED display panel according to the present disclosure is not limited to that shown in FIG. 4. In other words, the configuration of the OLED display panel according to the first embodiment of the present disclosure can be variously modified and altered without departing from the spirit of the present disclosure.

The flexible film 200 is disposed under the display panel 300. The flexible film 200 is attached to a lower surface of the display panel 300 by means of the first adhesion layer 250.

The first adhesion layer 250 is not formed in a fold portion/a fold area (or a hinge portion/a hinge area) of the foldable display device as shown in FIG. 3. In other words, the first adhesion layer 250 can be configured with two parts which are separated from each other by a width of a fold area (or a hinge area) of the foldable display device. If the first adhesion layer 250 is removed from the fold area (or the hinge area), a stress caused by the first adhesion layer 250 of the fold area (or the hinge area) due to folding and unfolding operations of the foldable display device can be minimized. As such, a deformation of the flexible film 200 can be prevented.

When the first adhesion layer 250 is formed in the above-mentioned manner separated into two parts (i.e., when the first adhesion layer 250 is removed from the fold area (or the hinge area)), an air gap 240 is formed in a separate space. The air gap 240 is filled with air. The air within the air gap 240 is discharged to a downside of the flexible film 200 via air paths 220, which are formed in the flexible film 200 and will be described later, when the foldable display device is folded. On the contrary, when the foldable display device is unfolded, the air is charged into the air gap 240 via the air paths 220 and generates an air pressure pushing-up the fold portion (or the hinge portion) of the display panel 300. Such an air pressure enhances a restoring force smoothing the waviness which is caused by the folding and unfolding operations of the display device.

The formation material of the first adhesion layer 250 is not limited to fixed materials. For example, the first adhesion layer 250 can be formed from one of optical clear adhesives, which are being used in an art of the present disclosure, without limitation.

The flexible film 200 is used to support the display panel 300. To this end, the flexible film 200 can be formed from a pliable material. For example, the flexible film 200 can be formed from one of a polymer resin material, a metal and so on. The polymer resin material can include one or more of polyethyleneterephtalate, polycarbonate, polyimide, polyamide, polyurethane, polymethylmethacrylate PMMA, polyvinyl alcohol and acrylonitrile-butadiene-styrene resins.

The flexible film 200 included in the foldable display device of the present disclosure is preferably formed to have a lengthier major edge than that of the display panel 300. In detail, the flexible film 200 is preferably formed in a manner satisfying the following equation 1.

$$L2-L1=(R2-R1)\times\pi \quad \text{[Equation 1]}$$

Figure 5:
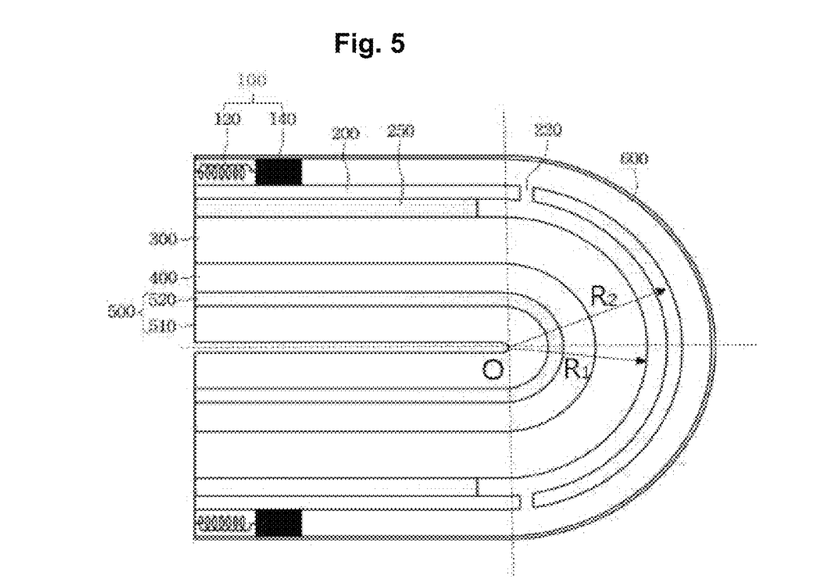
FIG. 5 is a cross-sectional view showing a fold state of a foldable display device in accordance with an embodiment of the present invention.

In the equation 1, 'L1' is a length of the major edge of the display panel 300, 'L2' is a length of the major edge of the flexible film 300, 'R1' is a radius of curvature of the completely folded display panel 300, and 'R2' is a radius of curvature of the completely folded flexible film 300. When the display device is completely folded as shown in FIG. 5, not only the 'R1' can be defined as a distance from a fold point (or a hinge point) 'O' of the display device to a lower surface of the display panel 300 but also the 'R2' can be defined as another distance from the fold point (or the hinge point) 'O' to a lower surface of the flexible film 200.

In the equation 1, the 'L2−L1' means a lengthier extension portion of the flexible film 200 compared to the display panel 300. Preferably, the extension portion of the flexible film 200 is disposed in the removed area of the first adhesion layer (i.e., the area between the separated two parts of the first adhesion layer 200) as shown in FIG. 3.

Such a flexible film 200 can be formed lengthier than the display panel 300 and the extension portion of the flexible film 200 can be disposed in the separate area (or the removed area) of the first adhesion layer 250. In other words, the flexible film 200 can be disposed in a shape of downwardly sagging within the removed area of the first adhesion layer 250 corresponding to the central area (or the fold or hinge area) of the display device. As such, when the display device is folded, the extension portion (or the sagging portion) of the flexible film 200 is flattened and attached to the display panel 300 without any stretch. In accordance therewith, a tensile force applied to the flexible film 200 can be minimized and the generation of waviness can be minimized. Moreover, if the length of the flexible film 200 satisfies the above-mentioned equation 1, the flexible film 200 can come in finely closed contact with the display panel 300 without any gap when the display panel 300 is folded. As such, the foldable display device can realize a smooth outside appearance at a folded state of the display panel 300.

Also, the air paths 220 guiding the flow of air can be formed in the flexible film 200. The air paths 220 can be prepared by forming holes which each penetrate through the flexible film 200. Although it is shown in the drawings that two air paths 220 are formed in the flexible film 220, it is not limited to this. In other words, either only one air path 220 or at least three air paths 220 can be formed.

The air paths 220 can enable the air to flow into or out the air gap 240, which is formed in the separate space (the removed area) of the first adhesion layer 250, when the display device is folded or unfolded. As described above, when the display device is folded, the air within the air gap 240 flows toward the downside (or the outside) of the flexible film 200 through the air paths 220. On the contrary, when the display device is unfolded, the air flows into the air gap 240 through the air paths 220 and generates an air pressure which is used to push up a central portion (the fold area or the hinge area) of the display panel 300. Such an air pressure can enhance a restoring force which flattens or smoothes the waviness caused by unfolding the display device from the folded state.

The support members 100 included in the foldable display device of the present disclosure can be disposed under the flexible film 200 as shown in FIG. 3. The support members 100 can be disposed both edges of the display device opposite to each other, but the present disclosure is not limited to this. The support members 100 can not only be used to support the display panel 300 and the flexible film 200 but also allow the extension portion of the flexible film 200 to be stably disposed.

Each of the support members 100 is preferably configured to move from side to side (or in the lateral direction of the display device) by the air pressure. To this end, each of the support members 100 can include an elastic element 120 and a movable supporter 140 connected to the elastic element 120. The elastic element 120 can be extended and contracted by the air pressure, and the movable supporter 140 can be moved by the air pressure. Also, the elastic element 120 and the movable supporter 140 are not limited in shape and formation material. For example, the elastic element 120 can be a coil spring and the movable supporter 140 can be a push bar.

Such support members 100 disposed under the flexible film 200 can move from side to side (or in a horizontal direction). In detail, if the display device is unfolded, the movable supporter 140 can support the central portion (or the fold portion) of the display device because the elastic element 120 maintains an extended state without any contraction as shown in FIG. 3. On the contrary, when the display device is folded, the air within the air gap 240 is discharged to the downside (or the outside) of the flexible film 200 and generates the air pressure pushing-up the movable supporter 140. As such, not only the elastic element 120 is contracted but also the movable supporter 140 is pushed toward the lateral of the display device, as shown in FIG. 5. Moreover, the display device is re-unfolded, the air flows from the downside (or the outside) of the flexible film 200 into the air gap 240 and generates an air pressure pulling the movable supporter 140. Then, the elastic element 120 is extended and the movable supporter 140 supports the central portion (or the fold portion or the hinge portion) of the display device. In accordance with, the restoring force flattening (or smoothing) the waviness can be enhanced by a supporting force of the support member 100 when the display device is unfolded. Also, although a touching pressure generated by one of a stylus pen, a finger and so on is applied to the touch panel 400 which will be disposed on the display panel 300 later, the deformations, such as a sagging, the waviness and so on, of the touch panel 400 can be minimized because the display panel 300 is supported by the support members 100.

The touch panel 400 included in the foldable display device of the present disclosure can be disposed on the display panel 300.

Figure 6:
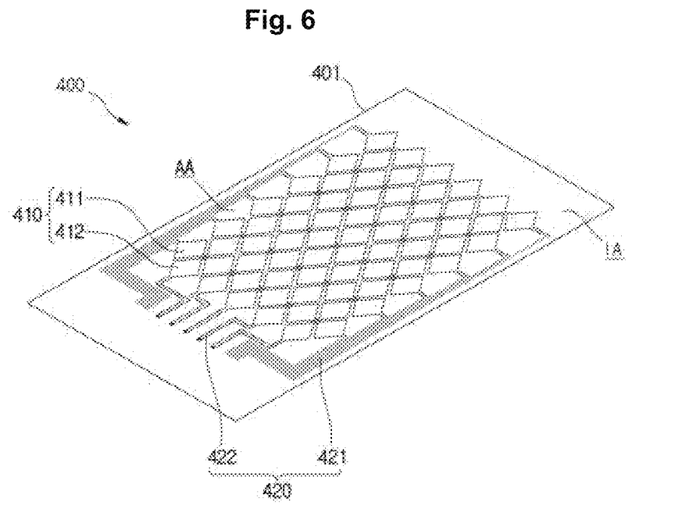
FIG. 6 is a planar view showing a touch panel of the foldable display device according to an embodiment of the present invention.

FIG. 6 shows a touch panel 400 of the foldable display device according to an embodiment of the present disclosure. As shown in FIG. 6, the touch panel 400 can include sensing electrodes 410 and scan lines 420 formed on a substrate 401. The substrate 401 is preferably a plastic substrate with flexibility, but it is not limited to this.

The touch panel 400 can be defined into a display area AA transmitting light and a non-display area IA intercepting light. The display area AA is used to input a command through a touch of a user. Unlike the display area AA, the non-display area IA cannot be used in the input of commands because it is not activated in spite of a touch of a user.

The sensing electrodes 410 are arranged on the display area AA, and the scan lines 420 are arranged on the non-display area IA. Although it is not shown in the drawing, a printed layer is additionally formed in the non-display area IA of the touch substrate 401. In this case, the scan lines 420 can be formed on the printed layer.

The sensing electrodes 410 can include a conductive material. For example, the sensing electrodes 410 can include any one selected from a material group which consists of a transparent conductive material, a metal, nanowire, a sensitive nano-wire film, carbon nanotube, graphene, conductive polymer and mixture thereof.

The sensing electrodes 410 can include first sensing electrodes 411 and second sensing electrodes 412. The first sensing electrodes 411 and the second sensing electrodes 412 can include the same material or different materials from each other. Also, the first sensing electrodes 411 and the second sensing electrodes 412 can be arranged on the same surface of the touch substrate 401.

In case the first sensing electrodes 411 and the second sensing electrodes 412 are arranged on the same surface of the touch substrate 401, the first sensing electrodes 411 and the second sensing electrodes 412 must be formed without contacting each other. To this end, an insulation layer and bridge electrodes can further be formed on the display area AA.

In detail, one side of the first sensing electrodes 411 and the second sensing electrodes 412 arranged under the insulation layer can be formed in such a manner as to be electrically connected to one another. The other side can be formed with being connected to the bridge electrodes formed on the insulation layer, and electrically connected to one another. As such, the first sensing electrodes electrically connected to one another can be isolated from the second sensing electrodes 412 by the insulation layer and the bridge electrodes. For example, the first sensing electrodes 411 can be electrically connected to one another by the bridge electrodes.

The first and second sensing electrodes 411 and 412 arranged on the display area AA can be used to sense a touch. To this end, the first sensing electrodes 411 can be connected to one another in one direction (for example, a horizontal direction), and the second sensing electrodes 412 can be connected to one another in another direction (for example, a vertical direction) different from one direction.

The scan lines 420 can include first scan lines 421 and second scan lines 422. In detail, the scan lines 420 can include the first scan lines 421 connected to the first sensing electrodes 411, and the second scan lines 422 connected to the second sensing electrodes 412.

The first scan lines 421 and the second scan lines 422 can be connected to a printed circuit board. In other words, the first scan lines 421 and the second scan lines 422 transfer touch signals sensed by the first sensing electrodes 411 and the second sensing electrodes 412 to the printed circuit board which is loaded with a driver chip, and allows a touch detecting operation to be performed. The printed circuit board can be a flexible printed circuit board (FPCB) as an example.

The first scan lines 421 and the second scan lines 422 can include a conductive material. For example, the first scan lines 421 and the second scan lines 422 can include a metal material such as silver Ag, copper Cu or others.

Although it is not shown in the drawing, a passivation layer can further be formed on the touch substrate 401 provided with the scan lines 420. The passivation layer can protect the scan lines 420. In detail, the passivation layer can prevent the scan lines 420 from being exposed to and oxidized by oxygen. Also, the passivation layer can prevent reliability deterioration due to moisture intrusion.

However, the touch panel 400 of the present disclosure is not limited to the drawings and the description provided above. In other words, any input device capable of inputting commands by touching a finger, a stylus pen or others on a front surface of a display device can be used as the touch panel 400 of the present disclosure. Actually, any touch panel being generally used by the public can be applied as the touch panel 400 of the present disclosure.

The touch panel 400 can be an add-on type touch panel 400. Alternatively, the touch panel 400 can be an integrated type touch panel 400. If the touch panel 400 is the add-on type touch panel 400, the touch panel 400 is prepared in such a manner as to be separate from the display panel 300. As such, a transparent adhesive layer can be formed between the touch panel 400 and the display panel 300. When the touch panel 400 is the integrated type touch panel 400, the touch panel 400 can be formed in a single body united with the display panel 300. As such, it is not necessary to interpose any adhesive layer between the display panel 300 and the touch panel 400. Also, the touch panel 400 can be formed in one of an on-cell type and an in-cell type.

If the touch panel 400 is the on-cell type, sensing electrodes and so on can be formed on the upper surface of the display panel 300. In detail, the sensing electrodes and so on can be formed directly on an upper substrate of the display panel 300. Also, the touch panel 400 can be formed in such a manner as to be separate from the cover substrate 200, like the add-on type touch panel 400. Alternatively, the on-cell type touch panel 400 can be formed in a single body united with the cover substrate 200.

When the touch panel 400 is the in-cell type, sensing electrodes and so on can be formed between the first and second substrates of the display panel 300. In other words, the sensing electrodes and so on can be simultaneously formed when display elements are formed in the display panel 300.

The cover window member 500 included in the foldable display device can be disposed on one of the display panel 300 and the touch panel 400. Such a cover window member 500 includes a cover window 510 configured to prevent the display panel 300 or/and the touch panel 400 from external impacts, scratches and so on. The cover window 510 can be formed from a transparent hard material such as a plastic material. Also, a coating layer used to enhance a surface hardness and properties of anti-reflection and anti-fingerprint can further be formed on one surface of the cover window 510.

Also, the cover window member 500 can include a second adhesion layer 520 disposed on the lower surface of the cover window 510. The second adhesion layer 520 can be used to attach the cover window 510 onto either the touch panel 400 or the display panel 300. The second adhesion layer 520 is not limited to a fixed material. However, one of the optical clear adhesives used in the art of the present disclosure can be used in the formation of the second adhesion layer 510 without any limitation.

The foldable display device of the present disclosure can further include a case 600 configured to receive the support members 100, the flexible film 200 and the display panel 300. The case 600 can be used to stably fasten the components of the foldable display device. As such, the support members 100, the flexible film 200, the display panel 300, the touch panel 400 and the cover window member 500 can be fastened to two side walls of the case 600 opposite to each other.

Also, the case 600 can be formed from a material with superior flexibility which allows the foldable display device to be easily folded and unfolded. For example, the case 600 can be formed from one or any combination of a polymer resin material, a metal and so on. The polymer resin material can include polyethyleneterephtalate, polycarbonate, polyimide, polyamide, polyurethane, polymethylmethacrylate PMMA, polyvinyl alcohol and acrylonitrile-butadiene-styrene resins.

Figure 7:
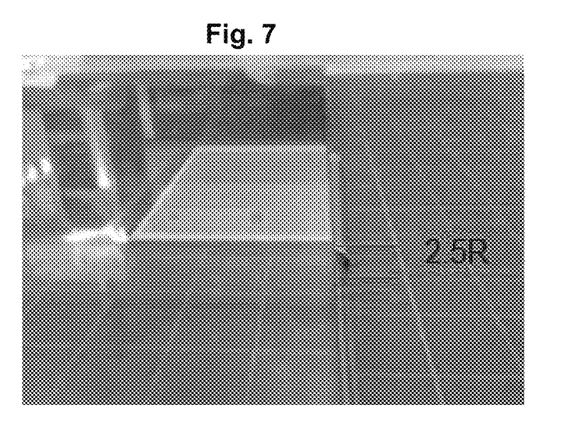
FIG. 7 is a photograph illustrating a method of evaluating waviness which is generated in a foldable display device according to an embodiment of the present invention.
Figure 8:
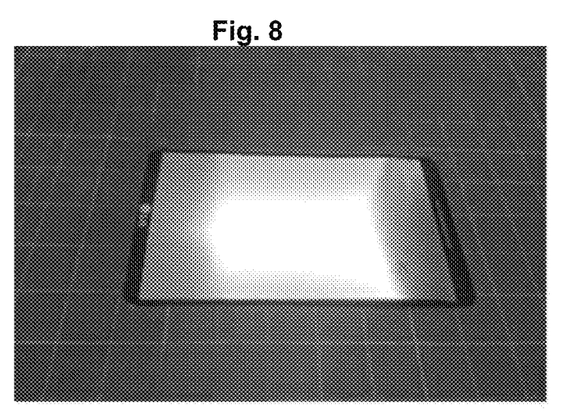
FIG. 8 is a photograph showing a state after an evaluation of waviness generation for a foldable display device in accordance with an embodiment of the present invention.

The foldable display device of the present disclosure with the above-mentioned configuration can minimize stresses, which is applied to the display panel and/or the touch panel at the fold and unfold operations of the display device, and enhance the restoring force flattening (or smoothing) the waviness. As such, although the foldable display device is unfolded after it is folded for a long time, the generation of waviness can be minimized. FIG. 8 is a photograph showing the foldable display device of the present disclosure which is unfolded after it is folded in a curvature of 2.5 R during 24 hours using a method shown in FIG. 7. As seen from FIG. 8, it is evident that waviness is hardly generated in the surface of the foldable display device which is unfolded after it is folded for a long time Also, although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. More particularly, various variations and modifications are possible in the component parts which are described in the embodiments. Accordingly, the scope of the present disclosure shall be determined only by the appended claims and their equivalents without being limited to the detailed description.

What is claimed is:

1. A foldable display device comprising:
   a display panel;
   a flexible film disposed under the display panel; and
   an adhesion layer interposed between the display panel and the flexible film but removed from a fold area of the display device.

2. The foldable display device of claim 1, wherein the flexible film is formed to have a lengthier major edge than that of the display panel.

3. The foldable display device of claim 1, wherein the flexible film is formed to have a major edge length which satisfies the following equation 1:

$$L_2 - L_1 = (R_2 - R_1) \times \pi \quad \text{[Equation 1]}$$

wherein in the equation 1, '$L_1$' is a major edge length of the display panel, '$L_2$' is the major edge length of the flexible film 300, '$R_1$' is a radius of curvature in a completely folded state of the display panel, and '$R_2$' is a radius of curvature in a completely folded state of the flexible film.

4. The foldable display device of claim 1, the adhesion layer forms an air gap by being partially removed.

5. The foldable display device of claim 4, wherein the flexible film includes an air path which allows air to flow into and out the air gap.

6. The foldable display device of claim 4, wherein the flexible film sags downwardly in an area in which the adhesion layer is removed.

7. The foldable display device of claim 1, further comprising a support member disposed under the flexible film.

8. The foldable display device of claim 7, wherein the support member is moved by an air pressure from side to side.

9. The foldable display device of claim 7, wherein the support member includes an elastic element and a movable supporter connected to the elastic element.

10. The foldable display device of claim 1, further comprising a case configured to receive the display panel and the flexible film.

11. The foldable display device of claim 1, further comprising a touch panel disposed on the display panel.

12. The foldable display device of claim 1, further comprising a cover window disposed on the display panel.

13. The foldable display device of claim 12, further comprising a support member disposed under the flexible film.

14. The foldable display device of claim 13, further comprising a touch panel interposed between the display panel and the cover window.

15. The foldable display device of claim 14, further comprising a case configured to receive the support member, the display panel, the flexible film, the touch panel and the cover window.

* * * * *